(12) United States Patent
Lehrter

(10) Patent No.: US 12,415,666 B2
(45) Date of Patent: Sep. 16, 2025

(54) BARRIER FILM

(71) Applicant: Okeanos Group, LLC, Miami Beach, FL (US)

(72) Inventor: Mary Lehrter, Cincinnati, OH (US)

(73) Assignee: OKEANOS GROUP, LLC, Miami Beach, FL (US)

( * ) Notice: Subject to any disclaimer, the term of this patent is extended or adjusted under 35 U.S.C. 154(b) by 0 days.

(21) Appl. No.: 17/648,611

(22) Filed: Jan. 21, 2022

(65) Prior Publication Data

US 2022/0227554 A1 Jul. 21, 2022

Related U.S. Application Data

(60) Provisional application No. 63/140,095, filed on Jan. 21, 2021.

(51) Int. Cl.
| | |
|---|---|
| *B65D 65/40* | (2006.01) |
| *B32B 1/00* | (2024.01) |
| *B32B 7/12* | (2006.01) |
| *B32B 9/04* | (2006.01) |
| *B32B 27/18* | (2006.01) |
| *B32B 27/30* | (2006.01) |

(52) U.S. Cl.
CPC ............... *B65D 65/40* (2013.01); *B32B 1/00* (2013.01); *B32B 7/12* (2013.01); *B32B 9/045* (2013.01); *B32B 27/18* (2013.01); *B32B 27/306* (2013.01); *B32B 2250/05* (2013.01); *B32B 2307/72* (2013.01); *B32B 2307/7244* (2013.01); *B32B 2307/7246* (2013.01); *B32B 2307/732* (2013.01); *B32B 2439/00* (2013.01)

(58) Field of Classification Search
None
See application file for complete search history.

(56) References Cited

U.S. PATENT DOCUMENTS

| | | |
|---|---|---|
| 4,606,879 A | 8/1986 | Cerisano |
| 6,280,680 B1 | 8/2001 | Liang |
| 8,889,047 B2 | 11/2014 | Lehrter et al. |
| 9,676,131 B2 | 6/2017 | Lehrter et al. |
| 10,011,063 B2 | 7/2018 | Lehrter et al. |
| 10,766,180 B2 | 9/2020 | Lehrter et al. |
| 2004/0072004 A1 | 4/2004 | Migliorini et al. |
| 2005/0037162 A1 | 2/2005 | Adams |
| 2011/0076506 A1 | 3/2011 | Blok et al. |
| 2011/0220533 A1* | 9/2011 | Shah ................... B32B 1/02 206/524.2 |
| 2018/0272589 A1 | 9/2018 | Lehrter et al. |
| 2019/0224952 A1 | 7/2019 | Clare |
| 2020/0087493 A1 | 3/2020 | Chow et al. |

FOREIGN PATENT DOCUMENTS

| | | |
|---|---|---|
| CN | 103435883 A | 12/2013 |
| WO | 2020/204984 A1 | 10/2020 |

OTHER PUBLICATIONS

International Search Report and Written Opinion for corresponding International Application No. PCT/US2022/070289, dated Apr. 1, 2022, 12 pp.
Extended European Search Report for corresponding European Patent Application No. 22743424.8, dated Nov. 6, 2024, 7pp.

* cited by examiner

*Primary Examiner* — Michael C Miggins
(74) *Attorney, Agent, or Firm* — Womble Bond Dickinson (US) LLP

(57) ABSTRACT

A barrier film includes: a first layer including calcium carbonate; and a second layer on the first layer, the second layer including an ethylene vinyl alcohol copolymer. A container includes at least one side including a barrier film including: a first layer including calcium carbonate; and a second layer on the first layer, the second layer including an ethylene vinyl alcohol copolymer.

19 Claims, No Drawings

BARRIER FILM

CROSS REFERENCE TO RELATED APPLICATION(S)

This application claims priority to and the benefit of U.S. Provisional Application No. 63/140,095, filed on Jan. 21, 2021, the entire contents of which are hereby incorporated by reference.

BACKGROUND

Barrier films are used to prevent or reduce the transmission of gases (e.g., oxygen, helium, and/or carbon dioxide) and/or moisture. Thus, a barrier film may be used to keep a gas and/or moisture inside or outside of an enclosed space. For example, the barrier film can be used to prevent or reduce a rate of spoilage of contents in a container. To achieve this effect, the barrier films may include, for example, a combination of a structural layer (e.g., a polymer layer) that provides the barrier film with suitable mechanical properties and a metal layer that provides low gas (e.g., oxygen, helium, and/or carbon dioxide) and/or moisture transmission rates through the barrier film. Currently, the recycling industry categorizes the structural layer and the metal layer of barrier films as two separate materials having different recycling requirements. As a result, barrier films that include a metal layer are considered non-recyclable.

Barrier films may also be used in the agricultural industry as agricultural plastics. Examples of agricultural plastics may include, but not limited to, mulching films, bale films, plastic bags, bags for feed, and greenhouse films. For example, a barrier film may be placed over plants to form a housing for the plants, and/or the plants may protrude through openings in a barrier film contacting soil that the plants are growing in so that the barrier film warms the soil and prevents or reduces growth of weeds adjacent to the plants. Barrier films made of polymers (e.g., plastics) that are used for plants become too dirty to be recycled and may be shredded or ground up and embedded in the soil, thereby contributing to plastic (e.g., microplastic) pollution. In some instances, the plastic films are shredded or ground every 40 days, thereby providing a significant source of plastic pollution. Further, any of the above-described agricultural plastics may be left in the soil or open environment, thereby contributing to plastic pollution. Plastic pollution is an increasing global issue, and therefore, it is desirable to find an alternative to the barrier films that are currently used in the agricultural industry.

SUMMARY

A barrier film according to embodiments of the present disclosure includes: a first layer including calcium carbonate; and a second layer on the first layer, the second layer including an ethylene vinyl alcohol copolymer.

DETAILED DESCRIPTION

In the following detailed description, only certain embodiments of the subject matter of the present disclosure are described, by way of illustration. As those skilled in the art would recognize, the subject matter of the present disclosure may be embodied in many different forms and should not be construed as being limited to the embodiments set forth herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Embodiments of the present disclosure are directed toward a barrier film including: a first layer including calcium carbonate; and a second layer on the first layer, the second layer including an ethylene vinyl alcohol copolymer (EVOH). The EVOH of the second layer is highly resistant to the transmission of gas (e.g., oxygen, carbon dioxide, and/or helium) and/or moisture. Additionally, the first layer including the calcium carbonate is also resistant to the transmission of gas (e.g., oxygen, carbon dioxide, and/or helium) and/or moisture. Thus, according to embodiments of this disclosure, the barrier film including the first layer and the second layer on the first layer provides a synergistic effect of preventing or reducing transmission of gas (e.g., oxygen, carbon dioxide, and/or helium) and/or moisture.

As such, the barrier film according to embodiments of this disclosure may be used in any suitable process or application in which a decrease in the transmission of gas (e.g., oxygen, carbon dioxide, and/or helium) and/or moisture. Embodiments of the barrier film may be used to form a mulching film, a bale film, a plastic bag, a bag for feed, and a greenhouse film. The barrier film may be used in any suitable manner for plants (e.g., crops, fruits, trees, and the like) and/or any suitable activities associated with the plants, and/or the barrier film may be used in any suitable manner for animals (e.g., livestock and the like) and/or any suitable activities associated with the animals.

In some embodiments, the barrier film may be used in the agricultural industry as a film, sheet, or layer to protect and/or warm plants (e.g., by trapping heat from the sun and/or ambient atmosphere). For example, embodiments of the barrier film may be placed over the plants to form a housing for the plants (e.g., a polytunnel, a polyhouse, a hoop house, a hoop green house, a grow tunnel, a high tunnel, or a greenhouse), and/or the respective plants may protrude through apertures (e.g., openings) in a barrier film contacting soil that the plants are growing in so that the barrier film warms the soil and prevents or reduces growth of weeds adjacent to the plants.

Utilizing embodiments of the barrier film in the agricultural industry reduces the contribution of the agricultural industry to plastic pollution and may provide additional benefits. For example, because the barrier film includes calcium carbonate, the barrier film may stabilize or improve the pH of the soil as the barrier film decomposes and adds calcium carbonate to the soil. In some embodiments, as the barrier film decomposes, calcium carbonate is added to the soil from the barrier film, thereby raising the pH of the soil.

The barrier film may be configured to decompose over a set or predetermined time that may coincide with times for pH adjustment of the soil. For example, the decomposition of the barrier film and the addition of calcium carbonate to the soil may be configured to correspond with the biological profile of the plants that are being protected and/or warmed by the barrier film. In some embodiments, the barrier film may be configured to release calcium carbonate into the soil during a set or predetermined time to control the pH of the soil. In some embodiments, the concentration of the calcium carbonate and/or EVOH may be adjusted, and/or a decomposition additive may be included in the barrier film, so that the barrier film releases the calcium carbonate during the set or predetermined time. In some embodiments, the barrier film may be plowed into the soil so that the barrier film decomposes and releases calcium carbonate into the soil after having been plowed into the soil. In some embodiments the barrier film balances the pH of acidic soils based on a degradation rate of the barrier film, thereby harmonizing the pH of the soil with the pH profile or needs of the plants (e.g., crops, fruits, trees, and the like) to maximize or increase agricultural yield and growth performance.

Embodiments of the barrier film may be formed as a mono-material to enhance recyclability and/or reuse, for example, when used as a silage film. In some embodiments, the barrier film may include a plurality of layers that are the same as or different from each other. The plurality of layers may have degradation rates that are the same as or different from each other. In some embodiments, one or more of the plurality of layers may include an additive (e.g., a degradant), and/or one or more of the plurality of layers may be free or substantially free of an additive (e.g., a degradant). As used herein, the term "substantially free" means that the cited component is not present, or, if present, is only present as an incidental impurity.

The additive may be any suitable additive generally used in the art that accelerates degradation of a polymer. In some embodiments, the additive may include an oxo-degradable additive (e.g., an oxo-biodegradable additive), but the present disclosure is not limited thereto, and the additive may be include any suitable additive generally used in the art that accelerates degradation of a polymer. For example, the additive may not include, and may be completely free of, oxo-degradable additives and oxo-biodegradable additives. In some embodiments, the barrier film is completely free of oxo-degradable additive and oxo-biodegradable additives. The barrier film may include that the additive in an amount of 0.01 wt % to 20 wt % (or 0.01 wt % to 10 wt %), based on the total weight of the barrier film. The additive (e.g., the oxo-degradable additive) may increase the rate at which the polymer oxo-degrades when exposed to oxygen. For example, the oxo-degradable additive may increase the rate at which the polymer is oxidized. The polymer may breakdown when exposed to oxygen without the need for bacteria microbes to initially break down the polymer. After (or concurrently or simultaneously with) the oxidation of the polymer, organisms (e.g., microbes, bacteria and/or the like) may further degrade the remaining portions of the polymer. This process may be referred to as oxo-biodegradation. Thus, the oxo-degradable additive causes the polymer to oxo-biodegrade.

The additive may include any suitable additive that increases the rate at which the polymer is oxidized or oxo-biodegraded. The additive may include any non-heavy metal additive or salt that complies with European Union Packaging Waste Directive 94/62, Article 11 and similar U.S. laws and/or regulations. In some embodiments, the oxo-degradable additive includes a salt such as, for example, an iron salt, a manganese salt, a cobalt salt, and/or any suitable non-heavy metal salt, but the present disclosure is not limited thereto. As used herein, the term "heavy metal" may refer to those elements that are restricted under European Union Packaging Waste Directive 94/62, Article 11. Non-limiting, non-heavy metal, commercially available examples of the oxo-degradable additive include those available from Willow Ridge Plastics Inc. (Erlanger, Kentucky) and/or Bio-Tec Environmental, LLC (Cedar Crest, New Mexico).

In some embodiments, a concentration of the additive may vary along a concentration gradient from one side to another side of the barrier film. For example, one side of the barrier film may be exposed to direct ultraviolet (UV) light (e.g., from the sun), which catalyzes breakdown of the barrier film resulting in an increased degradation rate relative to a side that is not directly exposed the UV light. Accordingly, in some embodiments, the side that is not directly exposed to the UV light may have a relatively higher concentration of the additive (e.g., the degradant) while the side exposed to the UV light may have a relatively lower concentration of the additive (e.g., the degradant), or may be free or substantially free of the additive to thereby more closely match a degradation rate of the side directly exposed to the UV light with the degradation rate of the side that is not exposed to the UV light. In some embodiments, the concentration of the additive may decrease along a concentration gradient from the side not directly exposed to the UV light to the side directly exposed to the UV light.

The barrier film, and articles formed from the barrier film, may be prepared according to any suitable method, including, but not limited to, extrusion, thermoforming, and/or molding together with density reduction. For example, the barrier film may be molded, for example, to form pesticide bottles, irrigation tubes, and/or the like, or the barrier film may be thermoformed, for example, to form seedling trays, nursery pot trays, and/or the like. Methods of forming the barrier film and articles formed from the barrier film are described in further detail herein below.

In some embodiments, the barrier film may be used to form a container designed to retain gas (e.g., oxygen, carbon dioxide, and/or helium) and/or moisture inside or outside of the container. According to one or more embodiments, the container includes at least one side including a barrier film including: a first layer including calcium carbonate; and a second layer on the first layer, the second layer including an ethylene vinyl alcohol copolymer. In some embodiments, each side of the container may include the barrier film, but the present disclosure not limited thereto. For example, in some embodiments, less than each side of the container or only one side of the container may include the barrier film.

The container may be any suitable container that contains or will contain a product or article that is sensitive to the transmission of gas (e.g., oxygen, carbon dioxide, and/or helium) and/or moisture into and/or out of the container. For example, the container may be any suitable container for which a gas barrier, chemical resistance (e.g., solvent resistance), and/or the like is desirable. In some embodiments, the container may include a sealed bag (e.g., a bag that contains or will contain chips, popcorn, and/or the like), an unsealed bag (e.g., a grocery bag) a wrapper (e.g., a wrapper that contains or will contain a snack bar, health bar, and/or the like), a blister pack (e.g., a blister pack that contains or will contain a medicament and/or the like), a pouch, a confectionary package (e.g., a package that contains or will contain candy, ice cream, and/or the like), a cereal bag (e.g., a bag that that contains or will contain a cereal product and/or the like), a dairy product container (e.g., the barrier film may be a peel off layer of a yoghurt container and/or the like, and/or the barrier film may be an interior and/or exterior layer of container that contains or will contain milk and/or the like), a bottle (e.g., a bottle to contain a carbonated beverage such as, for example, beer and/or the like), a box (e.g., a box that contains or will contain beer, wine, juice, soup, and/or the like), a can (e.g., the barrier film may be an interior and/or exterior layer of a can that contains or will contain soup, vegetables, and/or the like), a bread bag (e.g., a bag that contains or will contain bread), a bagel bag (e.g., a bag that contains or will contain bagels), containers that contains or will contain agricultural products, balloons, and/or the like, but the present disclosure is not limited thereto. In some embodiments, the barrier film may be used as a single or sole sheet, for example, as a space blanket (e.g., an emergency blanket) and/or the like, but the present disclosure is not limited thereto.

Because the first layer including calcium carbonate and the second layer including EVOH are categorized by recyclers as a single material, embodiments of the barrier film of the present disclosure are recyclable according to existing recycling methods. Thus, embodiments of the present disclosure provide a barrier film that is recyclable while also providing low transmission rates of gas (e.g., oxygen, carbon dioxide, and/or helium) and/or moisture through the barrier film. For example, embodiments of the barrier film may have a moisture vapor transmission rate (MVTR) of 0.0250 to 0.0750 g/100 in$^2$/24 hrs, 0.0350 to 0.0550 g/100 in$^2$/24 hrs, or 0.0415 to 0.0450 g/100 in$^2$/24 hrs, where the MVTR is measured according to ASTM F1249 at a temperature of 100° F. and a relative humidity (RH) of 90%. In some embodiments, the barrier film may have an oxygen transmission rate ($O_2$TR) of 0.0350 to 0.0800 cc/100 in$^2$/24 hrs, 0.0450 to 0.0600 cc/100 in$^2$/24 hrs, or 0.0500 to 0.0550 cc/100 in$^2$/24 hrs, where the $O_2$TR is measured according to ASTM D3955 at a temperature of 73° F. and RH of 0%. The present disclosure, however, is not limited to articles that are recyclable. Thus, in some embodiments, the barrier film may be used together with other materials that render the barrier film non-recyclable.

According to embodiments of the present disclosure, the barrier film includes a first layer and a second layer on the first layer, but the present disclosure is not limited thereto. For example, the barrier film may further include a tie film between the first layer and the second layer. In some embodiments, the barrier film includes a third layer including calcium carbonate on the second layer. A composition of the third layer including the calcium carbonate may be the same as or different from that of the first layer.

In some embodiments, the barrier film may include a tie layer between the second layer and the third layer. Thus, in some embodiments, the barrier film may include the first layer, the second layer on the first layer, a first tie layer between the first layer and the second layer, the third layer on the second layer, and a second tie layer between the second layer and the third layer.

In some embodiments, the first layer and/or the third layer may each independently be two or more layers. For example, the first layer may include a first sub-layer and a second sub-layer, and/or the third layer may include a first sub-layer and a second sub-layer, each of the first sub-layer and/or the second sub-layer including calcium carbonate. Each of the first sub-layer and the second sub-layer may be formed by a separate extruder. Thus, according to an embodiment of the disclosure, the barrier film may be formed by seven extruders respectively forming a first layer including a first sub-layer and a second sub-layer, a first tie layer, a second layer including EVOH, a second tie layer, and a third layer including a first sub-layer and a second sub-layer. The present disclosure, however, is not limited thereto. For example, the first layer may include a first sub-layer, a second sub-layer, and a third sub-layer, and/or the third layer may include a first sub-layer, a second sub-layer, and a third sub-layer, each of the first sub-layer and/or the second sub-layer including calcium carbonate.

According to embodiments of the present disclosure, the first sub-layer and the second sub-layer of the first layer and the first sub-layer and the second sub-layer of the third layer may each independently have a thickness that is 15 to 25%, 17 to 23%, or 20 to 21% of the total thickness of the barrier film. In some embodiments, the first sub-layer and the second sub-layer of the first layer and the first sub-layer and the second sub-layer of the third layer may each independently have a thickness in a range of 0.45 to 0.75 mil (11 to 19 μm), 0.51 to 0.69 (13 to 18 μm), or 0.60 to 0.63 mil (15 to 16 μm). Embodiments of the first tie layer and the second tie layer may each independently have a thickness that is 3 to 8%, 4 to 7%, or 5 to 6% of the total thickness of the barrier film. In some embodiments, the first tie layer and the second tie layer may each independently have a thickness in a range of 0.09 to 0.24 mil (2.3 to 6.1 μm), 0.12 to 0.21 (3.1 to 5.3 μm), or 0.15 to 0.18 mil (3.8 to 4.6 μm). Embodiments of the second layer may have a thickness that is 3 to 30%, 5 to 20%, or 8 to 10% of the total thickness of the barrier film. In some embodiments, the second layer may have a thickness in a range of 0.09 to 0.90 mil (2.3 to 23 μm), 0.15 to 0.60 (3.8 to 15 μm), or 0.24 to 0.30 mil (6.1 to 7.6 μm).

Ethylene Vinyl Alcohol Copolymer

The EVOH of the present disclosure can be formed by any suitable copolymerization method. For example, the EVOH can be formed by copolymerization of ethylene and vinyl acetate, followed by hydrolysis to form the EVOH. The ethylene may be included in the EVOH at an amount in a range of 24 to 48 mol %, based on the total number of moles of the EVOH. For example, the ethylene may be included in the EVOH at an amount in a range of 27 to 48 mol %, 27 to 45 mol %, 27 to 42 mol %, 27 to 39 mol %, 27 to 36 mol %, 27 to 33 mol %, 30 to 48 mol %, 30 to 45 mol %, 30 to 42 mol %, 30 to 39 mol %, 30 to 36 mol %, 30 to 33 mol %, 36 to 48 mol %, 39 to 48 mol %, 42 to 48 mol %, 45 to 48 mol %, or any other range subsumed therein, based on the total number of moles of the EVOH (e.g., based on the total number of moles of monomer units in the EVOH).

The vinyl alcohol may be included in the EVOH at an amount in a range of 52 to 76 mol %, based on the total number of moles of the EVOH. For example, the ethylene may be included in the EVOH at an amount in a range of 52 to 73 mol %, 55 to 73 mol %, 58 to 73 mol %, 61 to 73 mol %, 64 to 73 mol %, 67 to 73 mol %, 52 to 70 mol %, 55 to 70 mol %, 58 to 70 mol %, 61 to 70 mol %, 64 to 70 mol %, 67 to 70 mol %, 52 to 64 mol %, 52 to 61 mol %, 52 to 58 mol %, 52 to 55 mol %, or any other range subsumed therein, based on the total number of moles of the EVOH (e.g., based on the total number of moles of monomer units in the EVOH).

The mole fraction (or mol %) of the ethylene and/or vinyl alcohol included in the EVOH may be determined in view of the cost of the EVOH, the melt flow rate (MFR, also referred to as fractional melt index or melt flow index) of the EVOH, and gas (e.g., oxygen, helium, and/or carbon dioxide) and/or moisture transmission rates of the EVOH. For example, as the mol % of EVOH decreases, the cost of the EVOH increases. Further, as the mol % of ethylene increases, the density of the EVOH decreases and the oxygen transmission rate increases, which may render the EVOH unsuitable for the barrier film.

The EVOH is not limited to any particular molecular weight. A non-limiting, commercially available example of the EVOH can be obtained from Kuraray Co. Ltd. (Tokyo, Japan). For example, the EVOH may include the EVAL™ ethylene vinyl alcohol copolymer available from Kuraray Co. Ltd. (Tokyo, Japan).

The second layer may further include a compatibilizer. The compatibilizer may include any suitable polymer that improves or increases the recyclability of the EVOH. For example, the compatibilizer may prevent or reduce the formation of gels and other defects that otherwise occur when recycling the EVOH. The compatibilizer can be included in the second layer in any suitable manner. For example, the compatibilizer can be physically mixed and/or chemically bonded to the EVOH of the second layer. A non-limiting, commercially available example of the compatibilizer is RETAIN™ available from Dow Inc.

The EVOH (and/or the second layer including the EVOH) may constitute 3 to 35% of the total thickness of the barrier film. For example, the EVOH (and/or the second layer including the EVOH) may constitute 5 to 35%, 8 to 35%, 11 to 35%, 14 to 35%, 17 to 35%, 20 to 35%, 23 to 35%, 26 to 35%, 29 to 35%, 32 to 35%, 5 to 8%, 5 to 11%, 5 to 14%, 5 to 17%, 5 to 20%, 5 to 23%, 5 to 26%, 5 to 29%, 5 to 32%, or any range subsumed therein, of the total thickness of the barrier film. When included in an amount of less than 5%, based on thickness, the EVOH (and/or the second layer including the EVOH) would have a thickness of less than about 0.09 mil, which may be formed using an extruder having a low diameter screw (e.g., an extruder having a screw having a diameter less than one inch or 25 mm).

Tie Material

The tie material promotes adhesion of the first layer and/or third layer to the second layer. The tie material may be included in the first layer and/or the third layer, and/or the tie material may be included in the tie layer (e.g., the first tie layer and/or the second tie layer). When included in the tie layer, the tie material constitutes 6 to 10%, of the total thickness of the barrier film. For example, the tie material constitute 6 to 9%, 6 to 8%, 6 to 7%, 7 to 10%, 8 to 10%, 9 to 10%, or any range subsumed therein, of the total thickness of the barrier film.

Embodiments of the tie layer may include a functionalized or non-functionalized adhesive resin that bonds dissimilar materials when co-extruded to form a multilayer film. For example, the functionalized or non-functionalized adhesive resin may include polyethylene copolymers including polar and/or nonpolar repeat units, and may, optionally, further include functional reactive groups. Non-limiting examples of the functionalized or non-functionalized adhesive resin may include ethylene-vinyl acetate (EVA), ethylene-methyl acrylate (EMA), ethylene-grafted-maleic anhydride (Pe-g-MAH), and combinations thereof.

First Layer and Third Layer Including Calcium Carbonate

The first layer and/or the third layer may constitute 55 to 91% of the total thickness of the barrier film. For example, the first layer and/or the third layer may constitute 55 to 88%, 55 to 85%, 55 to 82%, 55 to 79%, 55 to 76%, 55 to 73%, 55 to 70%, 55 to 67%, 55 to 64%, 55 to 61%, 86 to 89%, 83 to 89%, 80 to 89%, 77 to 89%, 74 to 89%, 71 to 89%, 68 to 89%, 65 to 89%, 62 to 89%, or any range subsumed therein, of the total thickness of the barrier film.

Examples of materials included in the first layer and/or the third layer including the calcium carbonate may be any of those described in U.S. Pat. Nos. 8,889,047; 9,676,131; 10,011,063; and 10,766,180, the entire contents of each of which are incorporated herein by reference. For example, the materials included in the first layer and/or the third layer including the calcium carbonate may be formed by a high stalk or pocket bubble blown film extrusion process for making micro-voided, paper-like film.

The first layer and/or third layer may include, by weight, from 20% to 60%, 30% to 55%, 40% to 50%, of high density polyethylene having a molecular weight of at least 200,000 daltons. As used herein, the term polyethylene means ethylene homopolymers or copolymers made of ethylene and at least one other olefin monomer. High density polyethylene means a polyethylene having a density of at least 0.940 g/cm$^3$, or from about 0.940 to about 0.960 g/cm$^3$. The high density polyethylene typically has a molecular weight of at least 500,000 daltons, at least 750,000 daltons, or, for example, 1,000,000 or 1,500,000 daltons. The high density polyethylene may have a molecular weight of less than about 3,000,000 daltons, or, for example, less than 2,000,000 daltons. In one embodiment, the high density polyethylene has a melt index of less than 0.2 dg/min, from 0.01 to 0.15 dg/min, from 0.02 to 0.10 dg/min, or, for example, from 0.02 to 0.06 dg/min. As used herein, melt index is measured by the procedures of A.S.T.M. D-1238-90b, and the density of polyethylene is measured by the procedures of A.S.T.M. D-1505-85. Mixtures or blends of high density polyethylene, with or without other polymer materials, for example, medium or low density polyethylene or polypropylene, may be used. A suitable temperature for stretching the film will depend on the particular polyethylene or blend of polyethylene selected. When stretching the film, the film temperature should be below the crystalline melting point and above the line drawing temperature. In practice, the actual film temperature is not usually measured, as described hereinafter.

The first layer and/or third layer further comprises, by weight, from 40% to 80%, from 45% to 70%, from 50% to 60%, of low aspect ratio filler material. The weight ratio of the low aspect ratio filler to the high density polyethylene is at least 0.7, at least 0.8, at least about 0.9, 1.0, 1.2, or, for example, 1.5. The term "aspect ratio," as used herein, refers to the ratio of particle length to particle thickness. For any given filler, the aspect ratio is the average value determined for a representative number of particles by examination through a microscope. The length is the longest dimension, measured through the center of mass of the particle. Once the length is known, it is possible to measure the dimensions of the particle in two other directions perpendicular to each other and perpendicular to the length. These two dimensions are referred to as the width and thickness of the particle, with the thickness being the smaller of the two when they are not equal. In general, the low aspect ratio fillers herein have an aspect ratio of less than 3, less than 2, less than 1.5. Fillers with low aspect ratios, e.g., tending to the ratio of 1.0, although irregular, are often described as spherical, round, or cubic. Suitable low aspect ratio fillers are selected from the group consisting of alkali metal and alkaline earth metal carbonates, sulphates and phosphates, and mixtures thereof. Examples include calcium carbonate, sodium carbonate, barium sulphate, calcium sulphate, sodium sulphate, sodium phosphate, potassium phosphate, and calcium phosphate. In some embodiments, the filler is calcium carbonate.

The particle size of the filler has an effect on the properties of the film. It is desirable that the fillers do not contain particles of excessively large size, otherwise holes or other defects may be generated during the film stretching process. The maximum particle size of the filler depends on the desired film thickness. A.S.T.M. procedure E2651-10, Standard Guide for Powder Particle Size Analysis, may be used to determine the size of the particles. When thicker films are to be produced, larger particles can be tolerated. If the average particle size of the low aspect ratio filler is too low, there is a tendency for the resulting films to have lower void fractions.

In general, it is desirable that the low aspect ratio filler has a maximum particle size less than 50 microns. It is also desirable that at least 99.9% by weight of the filler particles pass through a 325 U.S. mesh screen (nominal mesh openings of 44 microns). The low aspect ratio filler herein has a mean particle size of from 1 to 25 microns, from 1 to 20 microns, from 1 to 10 microns. A desirable range for the mean particle size, based on equivalent spherical diameter, for the low aspect ratio filler is from about 1 to about 10 microns, typically from about 3 to about 5 microns. Equivalent spherical diameter (ESD), the diameter computed for a hypothetical sphere which would have the same volume as the particle, is calculated as follows: ESD=(6×particle volume/$\pi$)$^{1/3}$.

While not intending to be limited by any particular mechanism or theory, it is believed that the films of the first layer and/or second layer have a structure with voids surrounding or adjacent to the low aspect ratio filler particles in the interior of the film. The smallest dimension of the low aspect ratio filler affects the formation of voids in the oriented film. If the particle size of the filler is too small, the voids are absent or too small to give practical paper-like films. If the particle size of the filler is too large, the film tends to have holes therein, thus destroying the integrity of the film. For smaller particle size low aspect ratio fillers, it may be desirable to add up to about 2% by weight of a $C_{10}$-$C_{24}$ organic acid, or blends thereof, before extruding the polymer-filler composition. For example, when calcium carbonate is used, it may be suitable to add up to 2% by weight, for example 1%, of a $C_{10}$-$C_{24}$ organic acid (e.g., coconut fatty acid, palmitic acid, or tallow fatty acid) to the composition.

The presence of microvoids in the film appears to manifest itself as an increase in opacity and whiteness of the film compared to films without microvoids. There is also a noticeable reduction in density due to the fact that the film is no longer a uniform solid structure. This reduction in density can create difficulties when comparing film samples of differing degrees of microvoiding. This may be further complicated by films that do not have smooth surfaces. For these reasons, additional measurements are used for evaluating the films.

The density of a film sample is determined by measuring the length, width and average thickness, and determining its mass. Care must be taken not to overly compress the sample when measuring the thickness. It is desirable to use a micrometer that applies only light force. After the polyethylene and low aspect ratio filler components are compounded together, the (compounded) resin density can be determined by using, for example, a density column or other suitable method. The "void fraction" for the film sample can be calculated from the following formula: Void Fraction=1−(Film density/Resin density). It should be noted that the void fraction calculated in this way takes into account internal voids and the effects of surface roughness. The films of the first layer and/or third layer have a void fraction of from 0.6 to 0.75, from 0.62 to 0.72. With such a high void fraction, the films have a relatively low density, from 0.40 to 0.70 g/cm$^3$, from 0.45 to 0.65 g/cm$^3$, or, for example, from 0.50 to 0.60 g/cm$^3$.

"Equivalent thickness" is calculated as follows: Equivalent thickness=Thickness×(1−Void fraction). The equivalent thickness is intended to be a measure of the thickness that the film would have had if compressed into a smooth, uniform, solid layer. Except where explicitly stated as "equivalent thickness," the term thickness refers to the measured thickness of the film and not the equivalent thickness.

The films of the first layer and/or third layer can be produced at lower thicknesses, e.g., down to 10 microns, and at higher yields, e.g., up to 600 lbs/hr, than generally obtained using other prior art processes. In various embodiments, the first and/or third layer provide one or more of the following benefits: films having low density and low gauge (thickness) at standard production rates; films having equal tensile strength at half the gauge of other prior art films; films having equal moisture barrier properties at half the gauge of prior art films; and films made with increased through-put (significantly reduced lb/msi) versus other prior art processes, e.g., a 100 micron thick film produced at 0.065 lb/msi versus a prior art film produced at 0.209 lb/msi, which translates into significant cost savings in the production of the film.

Films of the first layer and/or third layer combine the properties of both plastic and paper, for example, the moisture barrier, strength and elongation of plastic and the tear and feel of paper. The films generally have low extensibility and good flexural stiffness, die-cuttability, opacity, fold retention (good deadfold), and printability. As such, they are useful as a paper substitute and as a replacement for plastic films and paper currently used in flexible packaging and advertising signage. The films can be used in flexible wrap or bag packaging for toiletries, such as soaps, diapers, and tissues/wipes, and perishable and non-perishable food products, such as cereals, grain-based foods and snacks. The films can be laminated to fiber based materials, such as fiber board, corrugated sheeting and box containers, and provide moisture barrier properties and improved printing quality. The films can thus replace foil lining in packaging and foil used in unitized bubble packaging for food and medicinal products.

The films of the first layer and/or third layer are thermo-degradable and photodegradable when exposed to ultraviolet light, and the inorganic filler materials return naturally to earth in powder form, thus making the films more sustainable and environmentally friendly. The films reduce usage of costly polymer resin (produced from hydrocarbon fuels) in favor of less expensive inorganic filler materials. Manufacturing the film requires less energy and no water usage compared to paper products. Manufacturing the film also requires fewer steps and less energy than most plastic films due to the heat transfer properties of the inorganic filler materials and the low melt index of the high density polyethylene.

For certain applications, the film may be used without further treatment. For other applications, it may be desirable to include various additives conventionally used in the art, such as coupling agents, lubricants, dispersant agents, anti-static agents, antioxidants, processing aids, UV stabilizers and the like. Where the film is to be printed, it may be desirable to corona treat the oriented film. For other applications, e.g. films for in-mold labels, it may be desirable to corona treat and coat the film with an antistatic agent. After coating with a heat seal layer, the films are particularly useful for in-mold labels since they comprise recyclable, high density polyethylene resins. Heat seal layers are typically polyolefin materials having lower melting points than the films of the invention. Ethylene vinyl acetate (EVA) copolymers are examples of such heat sealing layers.

The polyethylene and low aspect ratio filler materials of the first layer and/or third layer are usually first compounded by known methods for melt blending thermoplastic polymers. For example, in a series of mixing, extruding, and milling steps, the polyethylene and low aspect ratio filler materials are compounded into pellets or granules having at least substantially homogeneous composition. In one embodiment, the materials are compounded into cylindrical shape pellets having a length and diameter of 3-5 mm. The pellets or granules are fed into an extruder, melted and extruded into a film using any suitable methods and apparatus generally used in the art. The extruded film may have a thickness of from 50 to 300 microns, typically from 200 to 300 microns. The film is then oriented, biaxially, using high stalk, blown film methods and apparatus generally used in the art. The resulting film may have a thickness of from 10 to 75 microns, from 20 about 50 microns.

In one embodiment, the film is oriented as described in U.S. Pat. No. 4,606,879, Cerisano, the entire contents of which are incorporated herein by reference. Cerisano discloses a blown film extrusion apparatus and process for producing a stabilized, high stalk between spaced-apart tandem air rings for increasing the production rate of blown polymers, while improving the film's physical and mechanical properties. The apparatus for forming the film is constructed of means for forming a progressively advancing tubular along a longitudinal axis, stabilizing means arranged exteriorly and interiorly of the film for preventing the oscillation of the film about the longitudinal axis over a set or predetermined distance by controlling the application of a gas stream over the exterior and interior surface of the film within the set predetermined distance, and expanding means arranged adjacent the boundary of the predetermined distance for expanding the film thereat.

In another embodiment, the apparatus for forming the film is constructed of an extruder for supplying plastic material in a flowable state, a die arranged in advance of the extruder for forming a progressively advancing tubular film along a longitudinal axis, a primary air ring arranged adjacent the die and exteriorly of the film, the primary air ring supplying a first gas stream over the exterior surface of the film, a cylinder arranged interiorly of the film and extending along the longitudinal axis from the die, the cylinder and the interior surface of the film defining an annular region between them for receiving a second gas stream, controlling means for controlling the first and second gas streams to stabilize the film over a set or predetermined distance by preventing the oscillation of the film about the cylinder, and a secondary air ring arranged adjacent the boundary of the set or predetermined distance and exteriorly of the film, the secondary air ring supplying a third gas stream over the exterior surface of the film for expanding the film thereat.

In another embodiment, the process for forming the film comprises the steps of forming a progressively advancing tubular film along a longitudinal axis, stabilizing the film over a set or predetermined distance by applying a gas stream over the interior and exterior surfaces of the film to prevent the oscillation of the film about the longitudinal axis, and expanding the film adjacent the boundary of the set or predetermined distance.

In yet another embodiment, the process comprises the steps of extruding a progressively advancing tubular film about a cylinder arranged along a longitudinal axis, applying a first gas stream over the exterior surface of the film, applying a second gas stream over the interior surface of the film within an annular region formed between the cylinder and the interior surface of the film, controlling the velocity and volume flow rate of the first and second gas streams over a set or predetermined distance to stabilize the film by preventing the oscillation of the film about the cylinder, and applying a third gas stream over the exterior surface of the film adjacent the boundary of the set or predetermined distance for expanding the film thereat.

After the blown film is formed, the film may be further processed by various means known in the art. For example, the film may be processed as shown in FIG. 2 of U.S. Pat. No. 6,280,680, Liang, incorporated herein by reference. In one embodiment, one end of the film 132 is drawn by a leading roller, such as shown in FIG. 2 of the Liang patent. The rotation speed of the leading roller is controlled so that the film 132 is substantially air-tight. The rotating speed of the leading roller, the amount of the extruded materials from the extruder 102, and the thickness of the film 132 are suitably controlled so that the film is inflated to a desired lay flat width relative to the blow ratio and die diameter at a distance of about 1000 mm to about 1700 mm from the extrusion die 108. The purpose of the inflation and drawing is to simultaneously stretch the film 132 in two directions, i.e., latitudinally and longitudinally, resulting in a paper-like film having a structure with two dimensional strength. Under inflation, the density of the paper-like film can be reduced from that of the combination of the raw materials, about 2 g/cm$^3$ to about 0.5 g/cm$^3$. Because the drawing force from the leading roller, the film 132 is drawn into a folding means provided between the leading roller and a cooling means so that the paper-like film is symmetrically folded into a folded flat paper. The purposes of the leading roller include drawing the initially formed film 132 with a low rotation speed so that the air from the cooling means is evenly blown thereto and stabilizing the film 132, and maintaining the film air-tight so that it is evenly inflated. Also, the rotation speed of the leading roller is a factor in the longitudinal stretch and thickness of the paper-like film. Of course, the rotation speed should be suitably adjusted to comply with the amount of extruded materials coming from the extruder 102. The folded paper typically passes a cutting means so that the folded paper is cut, e.g., into two sheets of paper. The two resulting sheets of the paper may be subjected to treatment of a surface corona and better adhesion can be obtained therefrom. The paper may then be collected on a roll. During the process, the thickness of the paper can be suitably controlled within a range from about 25 microns to about 75 microns, the width can be about 35-60 inches (about 0.9 M to 1.5 m), and the density can be about 0.4 g/cm$^3$ to about 0.7 g/cm$^3$.

The first layer and/or third layer may include a double-layered paper, triple-layered paper, or, higher layered paper, such as disclosed in U.S. Pat. No. 6,280,680, Liang. Such layered papers can be used for printing, packaging, and decoration, etc. Each layer can be designed with different colors as required by adding different pigments thereto. Single-layered papers, double-layered papers, triple-layered papers, and even papers having more than three layers, each independently having a thickness of from about 30 to about 150 microns and independently having the same or different components, can be laminated by a laminating machine, such as shown in FIG. 8 of the Liang patent, to form a two-layered laminated paper or a three-layered laminated paper having a thickness of from about 150 to about 450 microns.

The materials of the first layer and/or the third layer are suitable for the field of printing, packaging, and decoration. They can be used directly without any pretreatment or with suitable pretreatment, for instance glossy surface treatment and hazy surface treatment, for special purposes. Both water borne coatings and non-water borne coatings can be used to coat the papers of the first layer and/or third layer. The formulation of water borne coating may be comprised of acrylic resin, isopropanol, polyvinyl alcohol, clays, an anti-static agent, 28% aqueous ammonia, pure water, and vinyl acetate.

The following Table I discloses ranges for various operating parameters in producing blown tubular film of the first layer and/or third layer. The operating parameters are based on the use of a 300 mm (11.8 inches) diameter extrusion die. The mass flow, inside air flow, outside air flow and secondary air ring flow are directly proportional to the die diameter. Thus, for a 200 mm (8 inch) diameter extrusion die, the mass flow would be 200-1200 lb/hr, the inside air flow would be 40-1200 CFM, the outside air flow would be 40-1600 CFM, and the secondary air ring flow would be 120-4000 CFM.

TABLE I

| | UNITS | RANGE |
|---|---|---|
| Resin Melt Index | dg/min. | 0.02-0.15 |
| Melt Temp. | ° F. | 375-450 |
| Melt Pressure | Psi | 7000-9000 |
| Mass Flow | Lb/hr | 300-900 |
| Melt Tube Dia. | Inches | 3.2 to 6 |
| Melt Tube Thick | Mils | 20 to 200 |
| Inside Air Flow | CFM | 60-1800 |
| Inside Air Velocity | FPM | 1,000-24,000 |
| Inside Air Temp. | ° F. | −20 to 300 |
| Outside Air Flow | CFM | 60-2400 |
| Outside Air Velocity | FPM | 1,000-24,000 |
| Outside Air Temp. | ° F. | −20 to 300 |
| Sec. Air Ring Flow | CFM | 180-6000 |
| Sec. Air Ring Velocity | FPM | 2,000-24,000 |
| Sec. Air Ring Temp. | ° F. | −20 to 150 |
| Blow Up Ratio | — | 0.8 to 9.0 |
| Film Thickness | Mils | 0.1 to 20 |
| Film Speed | FPM | 30 to 1,000 |
| Melt Tube Height/Die dia. | — | 1-20 |

Micro-voided, blown tubular films of the first layer and/or third layer including, by weight, 50% high density polyethylene (molecular weight 1.0 to 1.5 million daltons) and 50% calcium carbonate (mean particle size 3-5 microns) are produced using the above described apparatus and process under the following conditions.

TABLE II

| | | EXAMPLES | | |
|---|---|---|---|---|
| | UNITS | I | II | III |
| Resin Type | | HDPE | HDPE | HDPE |
| Low Aspect Ratio filler | | CaCO3 | CaCO3 | CaCO3 |
| Resin Melt Index | dg/min. | .06 | .04 | .02 |
| Melt Temp. | ° F. | 450 | 450 | 450 |
| Die Diameter | mm | 300 | 200 | 150 |
| Melt Pressure | Psi | 8,000 | 6,000 | 4,000 |
| Mass Flow | Lb/hr | 800 | 550 | 300 |
| Inside Air Flow | CFM | 900 | 600 | 300 |
| Inside Air Temp. | ° F. | 45 | 45 | 45 |
| Outside Air Flow | CFM | 1200 | 800 | 400 |
| Outside Air Temp. | ° F. | 45 | 45 | 45 |
| Sec. Air Ring Flow | CFM | 3000 | 2000 | 1000 |
| Sec. Air Ring Temp. | ° F. | 45 | 45 | 45 |
| Blow Up Ratio | — | 2.8 | 2.8 | 2.8 |
| Film Thickness | Microns | 38 | 38 | 38 |
| Film Speed | FPM | 200 | 150 | 100 |
| Void Fraction | — | 0.62 | 0.62 | 0.62 |

Other films of the first layer and/or third layer are obtained when the above composition comprises, by weight, 40% high density polyethylene (molecular weight 1.0 to 1.5 million daltons) and 60% calcium carbonate (mean particle size 3-5 microns), or 30% the high density polyethylene and 60% calcium carbonate, or when about 1% of $C_{10}$-$C_{24}$ organic acid is added to the composition. For example, one film comprises 28% the high density polyethylene, 70% calcium carbonate, and 1 to 2% of additives, such as the $C_{10}$-$C_{24}$ organic acid. Other films of the first layer and/or third layer are obtained when 10% or 20% medium density polyethylene or polypropylene is added to the above composition, or when the calcium carbonate has a mean particle size of 10 microns or is replaced with barium sulphate, sodium sulphate, sodium phosphate, or calcium phosphate. Other films are obtained when the above films have a void fraction of 0.65, 0.70 or 0.75, or a density of 0.40, 0.50, or 0.65 g/cm$^3$, and a thickness of 10, or 50 microns.

EXAMPLES AND COMPARATIVE EXAMPLES

Example

A seven layer barrier film was formed by co-extruding a first layer including a first sub-layer and a second sub-layer each including calcium carbonate, a first tie layer, a second layer including EVOH, a second tie layer, and a third layer including a first sub-layer and second sub-layer each including calcium carbonate stacked in the stated order.

Comparative Example 1

A barrier film including a matte polyethylene terephthalate (PET) layer on an adhesive and a metallized cast polypropylene layer (HC7217) was obtained from Belmark, Inc. (De Pere, Wisconsin).

Comparative Example 2

A barrier film including a matte polypropylene layer on an adhesive and a metallized polypropylene layer (34E23OY22P) was obtained from SP Flexible Packaging.

The MVTR of the Example and Comparative Examples 1 and 2 were measured according to ASTM F1249 at a temperature of 100° F. and a relative humidity (RH) of 90%. The $O_2$TR of the Example and Comparative Examples 1 and 2 were measured according to ASTM D3955 at a temperature of 73° F. and RH of 0%. The MVTR and the $O_2$TR of the Example and Comparative Examples 1 and 2 are shown in Table II below

TABLE II

| Property | Units | Comparative 1 | Comparative 2 | Example 1 |
|---|---|---|---|---|
| Moisture Vapor Transmission Rate (MVTR) ASTM F1249 | g/100 in$^2$/24 hrs 100° F./90% RH | 0.0491 | 0.020 | 0.0461 |
| Oxygen Transmission Rate ($O_2$TR) ASTM D3955 | cc/100 in$^2$/24 hrs 73° F./0% RH | 3.3934 | 0.010 | 0.0500 |
| Recyclable | | No | No | Yes |

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s). It will be understood that the spatially relative terms are intended to encompass different orientations of the device in use or in operation, in addition to the orientation described. For example, if the device is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. For example, as used herein, the terms "film," "sheet," and "layer" may be used interchangeably.

While the subject matter of the present disclosure has been described in connection with certain embodiments, it is to be understood that the subject matter of the present disclosure is not limited to the disclosed embodiments, but, on the contrary, the present disclosure is intended to cover various modifications and equivalent arrangements included within the spirit and scope of the appended claims, and equivalents thereof.

What is claimed is:

1. A barrier film comprising:
a first layer consisting of calcium carbonate, polyethylene, and a low aspect filler having an aspect ratio of less than 2;
a second layer on the first layer, the second layer comprising an ethylene vinyl alcohol copolymer; and
a third layer comprising calcium carbonate on the second layer,
wherein the first layer and/or the third layer constitute 55 to 91% of the total thickness of the barrier film,
wherein the barrier film does not include paper, and
wherein the barrier film is a blown film.

2. The barrier film of claim 1, wherein the ethylene vinyl alcohol copolymer comprises ethylene in an amount in a range of 24 to 48 mol % and comprises vinyl alcohol in an amount in a range of 52 to 72 mol %, each based on the total number of moles of the ethylene vinyl alcohol copolymer.

3. The barrier film of claim 1, wherein the second layer further comprises a compatibilizer.

4. The barrier film of claim 1, wherein the polyethylene is high density polyethylene having a molecular weight of at least about 500,000 and a melt index of less than 0.2 dg/min and the first layer is a micro-voided film consisting of by weight, i) from about 20% to about 60% of the high density polyethylene, and ii) from about 40% to about 80% of the low aspect ratio filler having a mean particle size from about 1 to about 25 microns, wherein the weight ratio of the low aspect ratio filler to the polyethylene is at least about 0.7, said film having a having a thickness of from about 0.1 to about 20 mils and a void fraction of from 0.60 to about 0.75 and a density of from about 0.40 to about 0.70 g/cm$^3$, wherein the voids are in the interior of the film.

5. The barrier film of claim 1, further comprising a tie material.

6. The barrier film of claim 5, wherein the tie material comprises ethylene-vinyl acetate (EVA), ethylene-methyl acrylate (EMA), ethylene-grafted-maleic anhydride (Pe-g-MAH), or combinations thereof.

7. The barrier film of claim 5, wherein the tie material is included in at least one selected from the first layer and a tie layer between the first layer and the second layer.

8. A barrier film comprising:
a first layer comprising calcium carbonate;
a second layer on the first layer, the second layer comprising an ethylene vinyl alcohol copolymer; and
a third layer on the second layer, wherein the third layer consists of calcium carbonate, polyethylene, and a low aspect filler having an aspect ratio of less than 2;

wherein the third layer has a composition that is the same as or different from the first layer, wherein the first layer and the third layer are the outermost layers of the barrier film, wherein the first layer and/or the third layer constitute 55 to 91% of the total thickness of the barrier film, and wherein the barrier film is not laminated.

9. The barrier film of claim 8, further comprising a first tie layer between the first layer and the second layer, and a second tie layer between the third layer and the second layer.

10. The barrier film of claim 9, wherein the first layer comprises a first sub-layer and a second sub-layer, wherein each of the first sub-layer and the second sub-layer comprises calcium carbonate, and wherein the first sub-layer has a composition that is the same as or different from that of the second sub-layer.

11. A container comprising at least one side comprising a barrier film comprising:

a first layer consisting of calcium carbonate, polyethylene, and a low aspect filler having an aspect ratio of less than 2; and a second layer on the first layer, the second layer comprising an ethylene vinyl alcohol copolymer, wherein the first layer constitutes 55 to 91% of the total thickness of the barrier film, wherein the barrier film does not include paper, and wherein the barrier film is a blown film.

12. The container of claim 11, wherein the ethylene vinyl alcohol copolymer comprises ethylene in an amount in a range of 24 to 48 mol % and comprises vinyl alcohol in an amount in a range of 52 to 72 mol %, each based on the total number of moles of the ethylene vinyl alcohol copolymer.

13. The container of claim 11, wherein the second layer further comprises a compatibilizer.

14. The container of claim 11, wherein the polyethylene is high density polyethylene having a molecular weight of at least about 500,000 and a melt index of less than 0.2 dg/min and the first layer is a micro-voided film consisting of, by weight, i) from about 20% to about 60% of the high density polyethylene, and ii) from about 40% to about 80% of the low aspect ratio filler having a mean particle size from about 1 to about 25 microns, wherein the weight ratio of the low aspect ratio filler to the polyethylene is at least about 0.7, said film having a having a thickness of from about 0.1 to about 20 mils and a void fraction of from 0.60 to about 0.75 and a density of from about 0.40 to about 0.70 g/cm$^3$, wherein the voids are in the interior of the film.

15. The container of claim 11, wherein the barrier film further comprises a tie material.

16. The container of claim 15, wherein the tie material comprises ethylene-vinyl acetate (EVA), ethylene-methyl acrylate (EMA), ethylene-grafted-maleic anhydride (Pe-g-MAH), or combinations thereof.

17. The container of claim 15, wherein the tie material is included in at least one selected from the first layer and a tie layer between the first layer and the second layer.

18. The container of claim 11, further comprising a third layer on the second layer, wherein the third layer comprises calcium carbonate, and wherein the third layer has a composition that is the same as or different from the first layer.

19. The container of claim 18, further comprising a first tie layer between the first layer and the second layer, and a second tie layer between the third layer and the second layer.

\* \* \* \* \*